(12) United States Patent
Hunter et al.

(10) Patent No.: US 9,048,029 B2
(45) Date of Patent: Jun. 2, 2015

(54) FLEXIBLE CONDUCTING POLYMER ENERGY STORAGE DEVICE

(71) Applicant: Massachusetts Institute of Technology, Cambridge, MA (US)

(72) Inventors: Ian W. Hunter, Lincoln, MA (US); Eli Travis Paster, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 151 days.

(21) Appl. No.: 13/764,991

(22) Filed: Feb. 12, 2013

(65) Prior Publication Data

US 2013/0155579 A1 Jun. 20, 2013

Related U.S. Application Data

(63) Continuation of application No. PCT/US2011/045493, filed on Jul. 27, 2011.

(60) Provisional application No. 61/372,998, filed on Aug. 12, 2010.

(51) Int. Cl.
| | | |
|---|---|---|
| *H01G 9/00* | (2006.01) | |
| *H01G 11/48* | (2013.01) | |
| *H01G 9/04* | (2006.01) | |
| *H01G 9/22* | (2013.01) | |
| *H01G 11/02* | (2013.01) | |
| *H01G 11/78* | (2013.01) | |
| *H01G 11/80* | (2013.01) | |
| *H01G 11/84* | (2013.01) | |

(52) U.S. Cl.
CPC .............. *H01G 11/48* (2013.01); *H01G 9/0029* (2013.01); *H01G 9/058* (2013.01); *H01G 9/22* (2013.01); *H01G 11/02* (2013.01); *H01G 11/78* (2013.01); *H01G 11/80* (2013.01); *H01G 11/84* (2013.01); *Y02T 10/7022* (2013.01); *Y02E 60/13* (2013.01)

(58) Field of Classification Search
USPC ......... 361/502, 503–504, 509–512, 516–519, 361/523–529
See application file for complete search history.

(56) References Cited

U.S. PATENT DOCUMENTS

| | | |
|---|---|---|
| 6,356,433 B1 | 3/2002 | Shi et al. |
| 6,535,373 B1 | 3/2003 | Smith et al. |
| 7,508,650 B1 | 3/2009 | Bluvstein et al. |

(Continued)

FOREIGN PATENT DOCUMENTS

EP    1156547 A1    11/2001

OTHER PUBLICATIONS

International Preliminary Report on Patentability issued in connection with corresponding PCT Application No. PCT/US2011/045493 mailed on Feb. 21, 2013.

(Continued)

*Primary Examiner* — Nguyen T Ha
(74) *Attorney, Agent, or Firm* — Gesmer Updegrove LLP

(57) ABSTRACT

Electrochemical redox supercapacitor. The supercapacitor includes two thin films of electrically conducting polymer separated by an ion-permeable membrane and including an electrolyte disposed between the two thin films. Electrical contacts are disposed on outer surfaces of the two thin films. The supercapacitor is flexible and may be rolled, folded on itself, or kept substantially flat. A suitable conducting polymer is polypyrrole. In another aspect, the invention is a method for making a redox supercapacitor.

12 Claims, 1 Drawing Sheet

(56) References Cited

U.S. PATENT DOCUMENTS

| | | |
|---|---|---|
| 7,903,390 B2 * | 3/2011 | Fan .............................. 361/502 |
| 2002/0114128 A1 | 8/2002 | Ryu et al. |
| 2007/0095656 A1 | 5/2007 | Nobuta et al. |
| 2007/0139862 A1 * | 6/2007 | Tateishi et al. ................ 361/502 |

OTHER PUBLICATIONS

International Search Report and the Written Opinion issued in connection with corresponding PCT Application No. PCT/US2011/045493 mailed on Dec. 22, 2011.

* cited by examiner

FLEXIBLE CONDUCTING POLYMER ENERGY STORAGE DEVICE

PRIORITY INFORMATION

The present application is a continuation of PCT Application No. PCT/US2011/045493, filed on Jul. 27, 2011, that claims priority to U.S. Provisional Application Ser. No. U.S. 61/372,998 filed on Aug. 12, 2010 both of which are incorporated herein by reference in their entireties.

SPONSORSHIP INFORMATION

This invention was made with Government support under Contract No. D11PC75421 awarded by the Department of Interior. The government has certain rights in the invention.

BACKGROUND OF THE INVENTION

This invention relates to electrochemical supercapacitors, and more particularly to a redox supercapacitor that is flexible so as to be able to take on a desired geometry.

The present invention commonly falls under the scientific classification of electrochemical supercapacitor. Electrochemical supercapacitors are commonly used as intermediate power sources in electric vehicle propulsion, backup computer battery systems, consumer electronics, etc., and can also be used for smaller, low-power devices.

Electrochemical supercapacitors are commonly classified into one of two energy storage mechanisms: double layer supercapacitors or redox supercapacitors. Double layer capacitors store energy by means of an electric double layer that forms on an electrode surface when subject to charging by the application of a potential difference between two electrodes separated by an electrolyte. Carbon materials (fiber matrices, nanotube sheets, paste/resin combinations, etc., which are faradaically inactive) are the most common electrode material for such supercapacitors. Because charge storage in double layer capacitors is a quantity related to the surface area, increasing the surface area is the primary goal to attain high energy densities.

Redox supercapacitors differ from electrochemical double layer capacitors in several regards. First, the mechanism of charge storage is not electrostatic (stored in an electrical double layer). Rather, charge is stored instead through the process of doping conducting polymer sheets within the redox supercapacitor during oxidation or reduction. An advantage of redox supercapacitors is that the amount of energy storage is a function of mass and not surface area. Increasing the mass of the conducting polymer materials will increase the amount of energy storage. In a system where volumetric dimensions are less critical than surface area dimension, redox supercapacitors may be advantageous.

It is an object of the present invention to provide a redox supercapacitor such that energy can be stored in a conformal, non-rigid configuration. As such, the redox supercapacitor of the invention can take on any desired geometry. The energy storage medium disclosed herein can be embedded into materials that change shape regularly such as clothing, accessories, robotic devices, etc.

SUMMARY OF THE INVENTION

In a first aspect, the present invention is an electrochemical supercapacitor including two thin films of electrically conducting polymer separated by an ion-permeable membrane, and including an electrolyte disposed between the two thin films. Electrical contacts are disposed on outer surfaces of the two thin films. In a preferred embodiment, the disclosed supercapacitor further includes non-conductive materials surrounding the conductive polymer, ion-permeable membrane, and electrolyte to form a stack. The stack may be rolled, folded, or kept substantially flat. In a preferred embodiment the stack is encased within a conformable material. In one embodiment, the conducting polymer is polypyrrole. The polypyrrole includes a dopant. It is preferred that the ion-permeable membrane has a thickness in the range of one micron to several hundred microns.

In another aspect, the invention is a method for making a redox supercapacitor including depositing a conducting polymer film on a conducting substrate by electrochemical deposition, and drying the film and removing it from the conductive substrate. Portions of the film are placed on opposite sides of an ion-permeable membrane to form a stack, and the stack is submersed within an electrolyte for a selected period of time. Electrical contacts are placed on the outer surfaces of the film portions. The conducting polymer film/ion-permeable membrane stack is then placed between two nonconductive layers of material. In a preferred embodiment, the stack is then rolled, folded or kept in a plane planar geometry, and encased within a conformable material. A suitable conformable material is polyester film or Mylar film. The outer edges of the film are heat sealed to preserve the electrolyte within. It is preferred that the stack be submersed within the electrolyte for a time period between approximately 10 seconds and 10 hours. It is also preferred that pressure be applied to the stack before it is sealed, to remove any excess air. After sealing, the stack can be purged with an inert gas such as nitrogen, argon, helium, etc.

DESCRIPTION OF THE PREFERRED EMBODIMENT

The present invention is a flexible energy storage device fabricated from conducting polymers, an ion-permeable membrane, a plastic casing and an electrolyte. Different types of this energy storage device are commonly referred to as redox supercapacitors. In a conducting polymer redox, supercapacitor charge transfer takes place by means of faradaic charge transfer in which polymer doping and undoping occurs when the polymer, in the presence of an electrolyte, is subjected to an electrical potential difference between two electrodes. The kinetics of electrochemical charge and discharge are reversible such that the supercapacitor can store energy, deliver energy, and then be recharged to store energy again. The amount of energy stored within the material depends largely on the mass of the material as opposed to the surface area.

Figure 1:
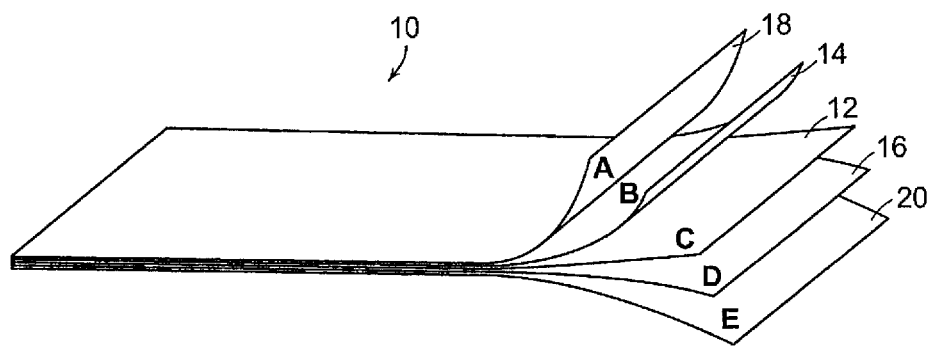
FIG. 1 is a schematic illustration of an embodiment of the invention.

An embodiment of the invention disclosed herein will now be discussed in conjunction with FIG. 1. As shown in FIG. 1 a redox supercapacitor 10 is made of five layers formed into a stack. An ion-permeable membrane 12 is flanked by conductive polymer films 14 and 16. Some ion-permeable membranes include polyvinyl fluoride (PVDF) membranes, filter paper, cellulose fiber papers, cotton cellulose fiber paper, cotton paper, etc. Non-conductive film layers 18 and 20 are preferably made from paper or plastic film.

The process for making the embodiment of the invention shown in FIG. 1 will now be discussed. A conducting polymer such as polypyrrole is fabricated by means of electrochemical deposition onto a conductive substrate such as glassy carbon, nickel, gold, steel, etc. Other suitable conducting polymers include polyaniline, poly(3,4-ethylenedioxythiophene), polyacetylene, poly(thiophene), etc. During electrochemical deposition a dopant exists within the electrolyte (such as tetrabutylammonium hexafluorophosphate, tetraethylammonium hexafluorophosphate, tetramethylammonium hexafluorophosphate, etc.) so that the resultant polymer becomes electrically conductive. The film thicknesses of the electrochemically deposited conducting polymer can vary from nanometers to millimeters. Suitable dopants include, but are not limited to, tetraethylammonium hexafluorophosphate, tetrabutylammonium hexafluorophosphate, sodium chloride, lithium trifluoromethanesulfonimide, tetraethylammonium hexafluoroborate, etc.

After electrochemical deposition the film is dried and removed from the conductive substrate. The film is then cut to desired dimensions such that two pieces of the conducting polymer film of similar dimensions are placed on opposite sides of an ion-permeable membrane 12 as shown in FIG. 1. The ion-permeable membrane 12 can vary in thickness from one micron to several hundred microns.

The conducting polymer films 14 and 16, and ion-permeable membrane 12 are then submerged within an electrolyte and soaked for a period of time between approximately 10 seconds and 10 hours. Thereafter, the conducting polymer films and ion-permeable membrane are then removed from the electrolyte and placed between two pieces of non-conductive material 18 and 20 such as paper or plastic film. Suitable electrolytes comprise a dopant, as previously mentioned, that is dissolved in a solvent such as water, propylene carbonate, acetonitrile, etc.

Electrical contacts (not shown) are formed on the outer surfaces of the two conducting polymer films 14 and 16 by placing an electrically conductive material in physical contact with the outer surfaces of the conducting polymer films 14 and 16. Electrical contacts can be made of thin metallic materials, other conducting polymer materials, or metallically coated plastics.

After the stack 10 is completed pressure is applied to the five layer stack that may then be rolled, folded upon itself or kept in a flat planar geometry as desired. After rolling, folding or kept flat, the stack 10 is enclosed within a conformable material such as a polyester film or a Mylar film, for example. The outer edges of this film are then sealed with heat such that any electrolyte or other liquid present within the stack does not leak out. During sealing a small vacuum can be applied to remove any air that may be present. During or after sealing, the stack can be purged with an inert gas to remove any excess air that is present in the enclosure.

Figure 2:
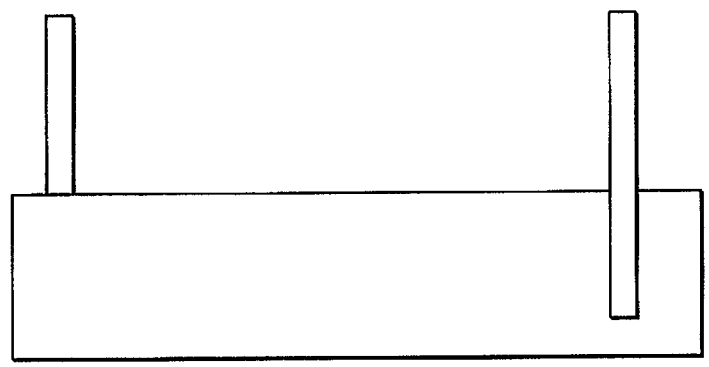
FIG. 2 is a photograph of a sealed stack according to the invention.

The sealed system can then be charged by the application of a voltage across the two electrical contacts. During the application of a voltage, one of the polymer films will reduce while the other film will oxidize. Energy will be stored within the sealed stack as mentioned earlier. The sealed stack, after being charged, delivers the energy which it is storing by connecting the two electrical contacts to an electrical load. The sealed stack disclosed herein can maintain the energy stored within it even when it is bent or being bent. The sealed stack can also deliver energy even when it is bent or being bent. The system can be recharged at any point after it has delivered some of its stored energy. A sealed stack according to this embodiment of the invention is shown in FIG. 2.

The supercapacitor of the invention holds energy regardless of whether the capacitor's geometry changes even after it has begun to store energy. Thus, the energy storage medium of the invention can be embedded into materials that change shape regularly, such as clothing, accessories, and robotic devices.

Those of ordinary skill in the art will recognize that the redox supercapacitor disclosed herein may be used in flexible display technologies such as electronic ink, eletro-chromic displays, and low-power LCD displays. Present day power sources are typically rigid and bulky, whereas the flexible power source disclosed herein can be integrated onto the back of a flexible display thereby eliminating all rigid components.

The invention disclosed herein can also be used in low-cost consumer advertising products such as business cards, pamphlets, posters in which a flexible power source supplies power for flexible or rigid displays, lights and embedded electronic components that are integrated into the above-mentioned advertising products. The present invention can also be used in conformal health monitoring devices such as pulse rate monitors, body temperature monitors, etc., in which the flexible power supercapacitor of the invention conforms to the section of the body to which it is attached.

The present invention can also be used in conformal drug delivery systems in which drug delivery, regulated by some mechanical, electrical or chemical mechanism, requires a conformable power supply to initiate or regulate all or part of the drug delivery process.

The present invention will also have application to clothing in which some sensory system within the clothing requires electrical power to monitor heat, moisture, stress or strain, etc., in both civilian and military applications. Suitable clothing might include hats, shirts, coats, pants, skirts, shoes, socks, sweaters, undergarments, gloves, scarves and other articles of clothing. Conformal electronic power supplies can also be used to regulate, actuate, or control some of the aforementioned components of the fabric such as heat, moisture, stress or strain.

The present invention may also be used in conjunction with optical accessories such as active, adaptive electro-chromic tinting on sunglasses or optical lenses. The invention will also have application to portable energy harvesting equipment such as intermediate energy storage for flexible solar cell systems. The invention will also have ready application to toys, watches, jewelry, paper and greeting cards.

It is recognized that modifications and variations of the present invention will be apparent to those of ordinary skill in the art, and it is intended that all such modifications and variations be included within the scope of the appended claims.

What is claimed is:

1. An electrochemical supercapacitor comprising:
    two thin films of electrically conducting polymer separated by an ion-permeable membrane and including an electrolyte disposed between the two thin films;
    electrical contacts disposed on outer surfaces of the two thin films; and
    a non-conductive material surrounding the conductive polymer, ion-permeable membrane, and electrolyte to form a stack.

2. The supercapacitor of claim 1 wherein the stack is rolled, folded or kept substantially flat.

3. The supercapacitor of claim 2 wherein the stack is enclosed within a conformable material.

4. The supercapacitor of claim 1 wherein the conducting polymer is polypyrrole.

5. The supercapacitor of claim 4 wherein the conductive polymer further includes a dopant.

6. The supercapacitor of claim 1 wherein the ion-permeable membrane has a thickness in the range of one micron to several hundred microns.

7. A method for making a redox supercapacitor comprising:

depositing a conducting polymer film on a conductive substrate by electrochemical deposition;
drying the film and removing it from the conductive substrate;
placing portions of the film on opposite sides of an ion-permeable membrane to form a stack;
submersing the conducting polymer film and ion-permeable membrane stack within an electrolyte for a selected period of time;
providing electrical contacts on outer surfaces of the film portion; and
placing the conducting polymer film/ion-permeable membrane stack between two non-conductive layers of material.

8. The method of claim 7 wherein the stack is rolled, folded or kept in a planar geometry and encased within a conformable material.

9. The method of claim 8 wherein the conformable material is a polyester film or Mylar film.

10. The method of claim 9 wherein the film outer edges are heat sealed.

11. The method of claim 7 wherein the selected period of time is between approximately 10 seconds and 10 hours.

12. The method of claim 7 wherein pressure is applied to the stack.

* * * * *